United States Patent [19]

Supernaw et al.

[11] 4,071,755

[45] Jan. 31, 1978

[54] METHOD FOR IN SITU EVALUATION OF THE SOURCE ROCK POTENTIAL OF EARTH FORMATIONS

[75] Inventors: Irwin R. Supernaw; Dan McCay Arnold, both of Houston; Arthur Jürgen Link, Wallis, all of Tex.

[73] Assignee: Texaco Inc., New York, N.Y.

[21] Appl. No.: 701,702

[22] Filed: July 1, 1976

[51] Int. Cl.² .............................................. G01V 5/00
[52] U.S. Cl. .................................. 250/253; 250/256; 250/262
[58] Field of Search ........................ 250/253, 256, 262

[56] References Cited

U.S. PATENT DOCUMENTS

| | | | |
|---|---|---|---|
| 2,346,789 | 4/1944 | Roper | 250/256 |
| 2,749,446 | 6/1956 | Herzog | 250/256 |
| 2,897,368 | 7/1959 | Lundberg et al. | 250/253 |
| 2,950,392 | 8/1960 | Campbell | 250/253 |
| 3,105,149 | 9/1963 | Guitton et al. | 250/369 |
| 3,496,350 | 2/1970 | Bray | 250/255 |
| 3,940,610 | 2/1976 | Dennis et al. | 250/369 |
| 3,976,878 | 8/1976 | Chevalier | 250/262 |

*Primary Examiner*—Harold A. Dixon
*Attorney, Agent, or Firm*—Carl G. Ries; Thomas H. Whaley; William J. Beard

[57] ABSTRACT

A technique for the in situ evaluation of the organic carbon content of earth formations penetrated by a well borehole is disclosed. The energy spectrum of natural gamma radiation occurring in earth formations penetrated by a well borehole is observed in energy regions corresponding to uranium, potassium and thorium. Quantitative evaluations of the relative abundances of these elements are made by comparing the observed spectra with standard gamma ray spectra. The relative abundances of these elements may then be interpreted in terms of the organic carbon content of earth formations by comparison with predetermined relationships found to exist therebetween.

5 Claims, 3 Drawing Figures

METHOD FOR IN SITU EVALUATION OF THE SOURCE ROCK POTENTIAL OF EARTH FORMATIONS

BACKGROUND OF THE INVENTION

This invention relates to radioactivity well logging and more particularly to techniques for natural gamma ray logging to determine the characteristics of shale formations.

In the course of interpreting information obtained by modern exploration techniques, it has been found that it is highly desirable to be able to determine the location of so-called "source rocks" for oil production in regions being explored. In the past, magnetic and seismic surveys have been utilized to locate sedimentary basins which contain thick deposits of ocean bottom sediments from ancient times. The seismic or aeromagnetic surveys can locate the general area of petroleum traps or impermeable rock structures in such sedimentary basins prior to the drilling of exploratory wells. It has been also common practice in the past to evaluate rock samples from exploratory wells drilled into suspected petroleum traps located in such sedimentary basins and to evaluate the oil bearing content of the rock from the rock cuttings.

Of course, the foregoing procedures have been successful in some instances and unsuccessful in other instances. The process of gathering core rock samples from an exploratory well for laboratory analysis is very time consuming and expensive because the drilling operation in such a well must be conducted in a careful manner in order to preserve the integrity of the rock cores. Also, core taking bits and attendant careful handling of the cores is required to preserve the information contained in the core samples.

According to the principles of the present invention a much faster method for analyzing the sedimentary rock layers penetrated by an exploratory borehole is provided. It has been found that a correlation may be established between the uranium content or the uranium, potassium and thorium content of shales which can be used as an indicator of the organic matter content of the shales. Thus, according to the techniques of the present invention, when an exploratory borehole is drilled, a natural gamma ray log may be analyzed in terms of the spectral energy distribution of the naturally occurring gamma rays from the earth formations penetrated by the borehole. This information can be interpreted in terms of the uranium, potassium and thorium content of the shales penetrated by the borehole. This radioactive element content of the shales is indicative of its characteristics as a source rock for the production of petroleum. Thus valuable information may be gained using the techniques of the present invention which can result in considerable savings of time and expenditures of money in evaluating the source rock potential of earth formations penetrated by a well borehole.

The invention is pointed out with more particularity in the appended claims. The invention is best understood by reference to the following detailed description thereof when taken in conjunction with the accompanying drawings in which:

DETAILED DESCRIPTION OF THE INVENTION

Figure 1:
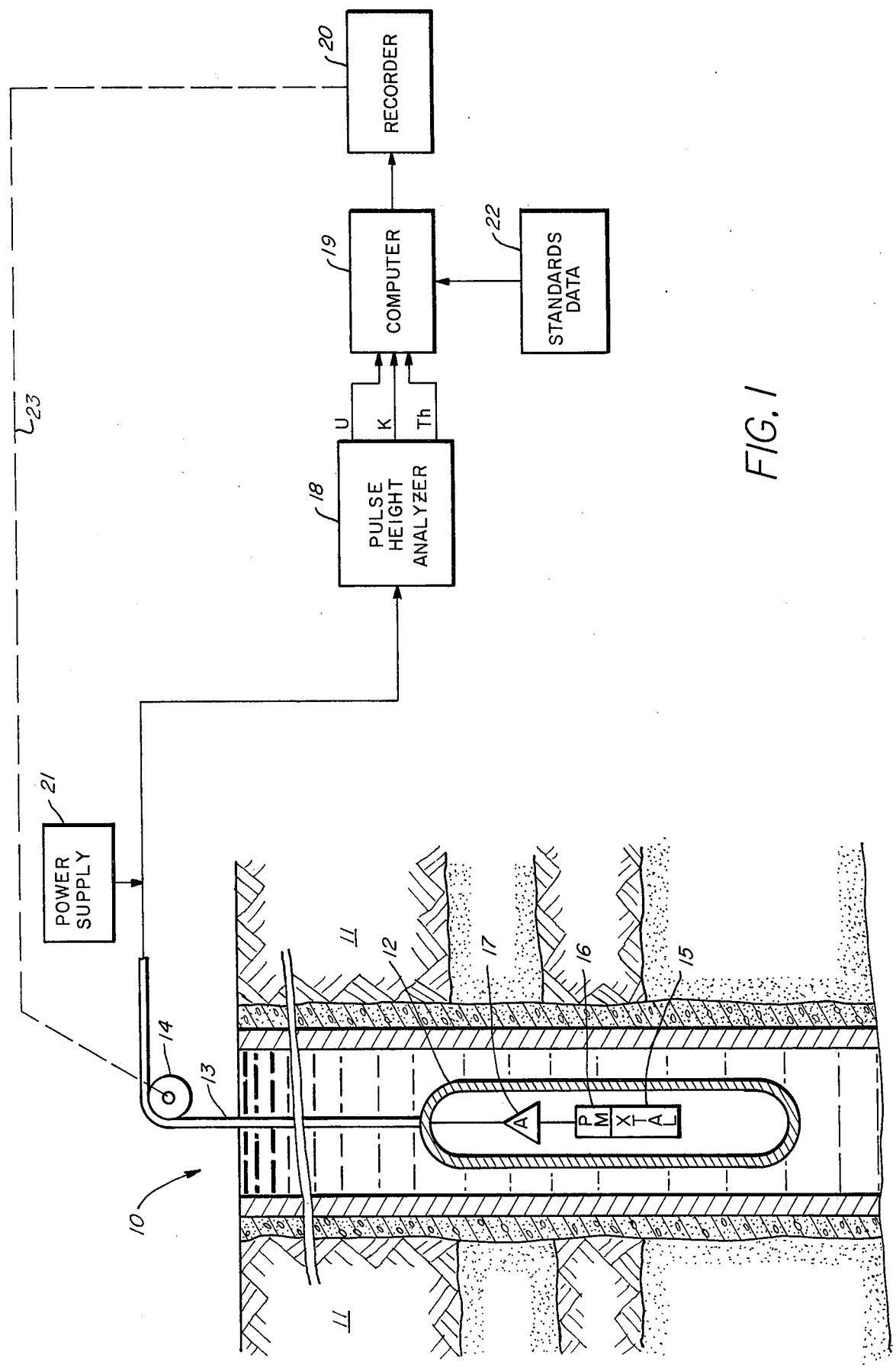
FIG 1. is a schematic representation illustrating the well logging technique of the invention.

Referring initially to FIG. 1 a fluid filled well borehole 10 is shown penetrating earth formations 11 and having suspended therein a well logging sonde 12. The well logging sonde is suspended in the borehole 10 by means of a conventional armored well logging cable 13 having one or more conductors for supplying power to the downhole instrumentation and for conducting signals from the downhole sonde 12 to the surface instrumentation. The fluid tight hollow body member or sonde 12 contains a naturally occurring gamma ray detecting system comprising a scintillation crystal 15, which may be either a sodium or cesium iodide thallium activated crystal or the like. The scintillation crystal 15 is optically coupled to a photomultiplier tube 16 for producing output electrical signals representative of natural gamma radiation occurring in the earth formations 11 in the vicinity of the borehole 10.

As is well known in the art gamma radiation from the earth formation 11 impinging upon the scintillation crystal 15 produces light flashes therein whose intensity is proportional to the energy of the gammay ray causing the scintillation. The photomultiplier 16 senses the scintillations in the crystal 15 and produces electrical pulses whose height or voltage level is proportional to the intensity of the light flashes produced in the scintillation crystals 15. Thus electrical voltage signals in the form of pulses are produced as output from photomultiplier tube 16. These voltage signals are amplified in an amplifier 17 and are transmitted to the surface on a conductor of the well logging cable 13.

The downhole sonde is suspended in the borehole 10 by means of a sheave wheel 14 which may be electrically or mechanically coupled (as indicated by the dotted line 23) to a recorder 20. Thus depth information concerning the depth location of the well logging sonde 12 which is provided by the sheave wheel 14 may be supplied to a recorder 20 for recording output signals from the downhole instrumentation as a function of borehole depths.

The voltage pulses representative of the energy of the naturally occurring gamma radiation in earth formations 11 in the vicinity of the borehole 10 is decoupled from the well logging cable 13 conductor at the surface and supplied to a pulse height analyzer 18 which may be of conventional design as known in the art. The pulse height analyzer 18 functions to sort and account for the naturally occurring gamma radiation from the earth formations 11 as a function of energy. In the case of the present invention the pulse height analyzer 18 is provided with at least three energy windows or bands of energy acceptance for separating gamma radiation occurring from the radioactive decay of radioactive isotopes of potassium, uranium and thorium.

For the purpose of separating gamma radiations occurring from radioactive potassium, uranium, thorium isotopes in the earth formations 11, the pulse height analyzer 18 is provided with at least three energy windows corresponding to these elements. The potassium energy window is chosen for the purposes of the present invention to extend from approximately 1.36 MEV to approximately 1.60 MEV. The uranium energy window is chosen to extend from approximately 1.60 MEV to approximately 1.95 MEV. Finally, the thorium energy window is chosen to extend from approximately 2.40 MEV to approximately 2.86 MEV in the gamma ray energy spectrum.

Thus the pulse height analyzer 18 provides output signals representative of the number of counts occurring in the energy window characteristic of the radioactive decay of the radioactive potassium uranium and thorium atoms in the earth formations 11 penetrated by the well borehole 10. These output signals are supplied to a computer 19 which may comprise for example a small general purpose digital computer such as the model PDP-11 provided by the Digital Equipment Corporation of Maynard, Mass. This small digital computer 19 may be programmed according to techniques known in the art known to perform the function of spectrum stripping or curve fitting of the gamma ray spectral information provided from the downhole sonde 12.

Techniques for spectral curve fitting or spectrum stripping will not be discussed in detail here as such are known in the art, see for example, U.S. Pat. No. 3,739,171 which is assigned to the assignee of the present invention. It will suffice to state herein that the spectrum from the downhole instrumentation is compared against spectral standards supplied from a standard spectrum data source 22 in the drawing of FIG. 1, in which the gamma spectrum of known standard elements may be quantitatively compared with that of the unknown earth formations 11 penetrated by the well borehole 10. Coefficients representative of the fraction of the gamma ray spectrum caused by the standards postulated to be contained in the downhole earth formations may thus be derived. This information is then supplied as an input to the recorder 20 where it may be recorded as a function of borehole depth as previously discussed.

While not illustrated in detail it will be appreciated by those skilled in the art that power for the operation of the downhole instrumentation contained in the sonde 12 is supplied from power supplies contained therein (not shown). The source of this power is surface power supply 21 which supplies electrical energy via conductors of the well logging cable 13 to the downhole power supplies. This electrical power is then converted into the proper voltage levels to power the photomultiplier tube and associated circuits in the downhole sonde 12 in a conventional manner.

Figure 2:
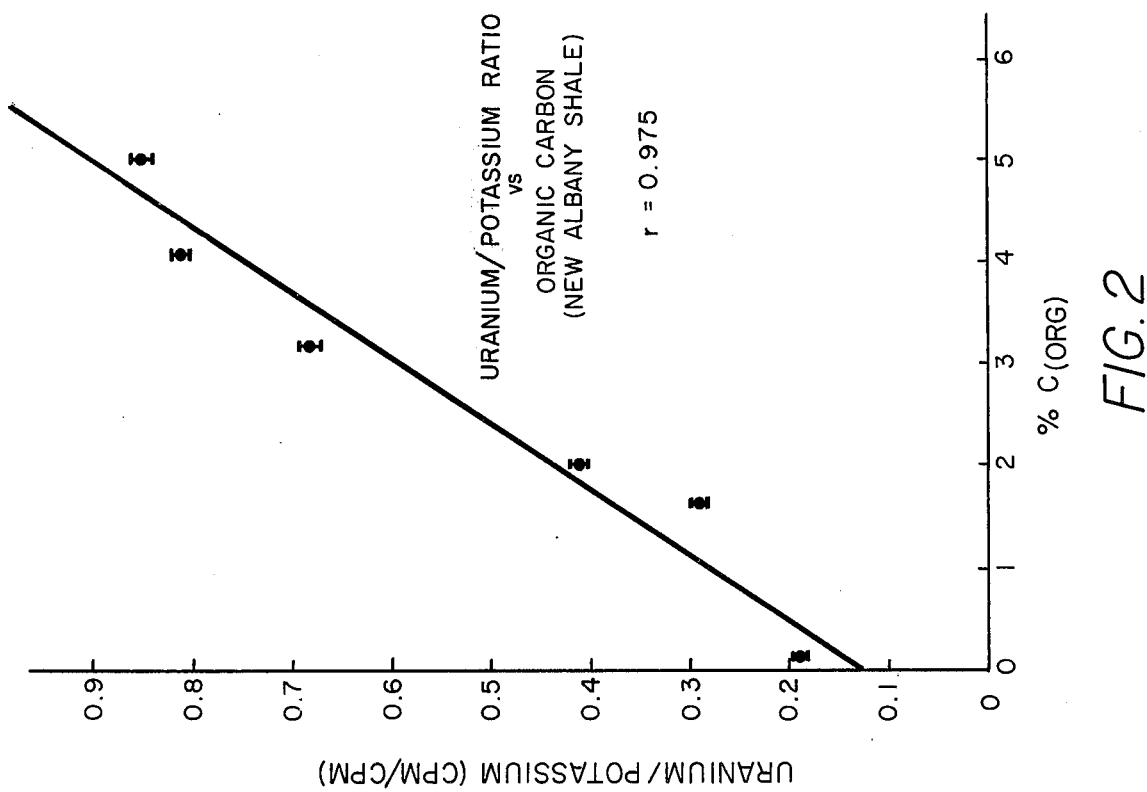
FIG. 2 is a graphical representation illustrating the correlation between the uranium content and the organic carbon content of a particular type of shale formation.

Referring now to FIG. 2, a graphical illustration showing the uranium to potassium content of the downhole earth formations 11 is plotted as a function of the percentage of organic carbon in a New Albany shale type formation. It can be seen that the data for the New Albany shale indicates a strong correlation between this uranium to potassium ratio as a function of the percentage of organic matter content.

Figure 3:
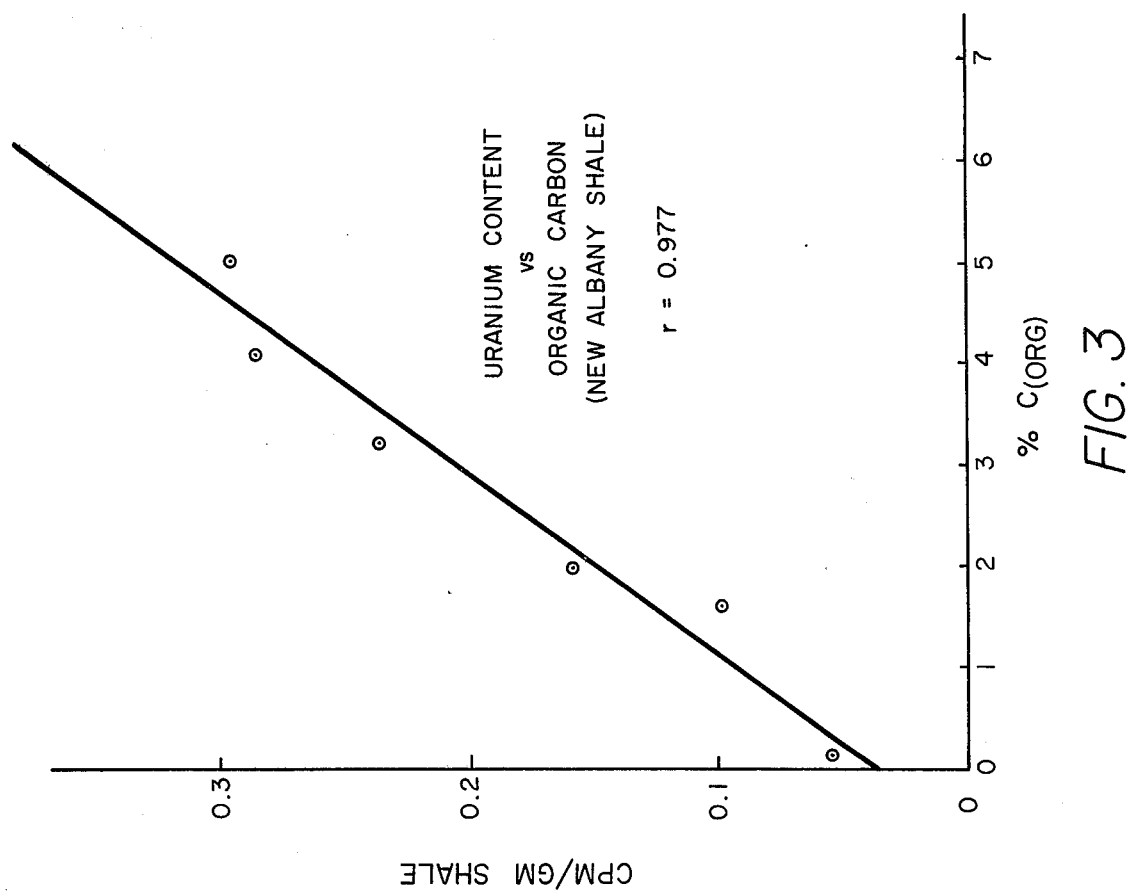
FIG. 3 is a graphical representation illustrating the uranium to potassium ratio as a function of the organic carbon content for a particular type shale formation.

Referring now to FIG. 3, the uranium content of a New Albany shale is plotted as a function of the percentage of organic carbon content of this shale. Again a strong correlation between the organic carbon content of the shale and the uranium content of the shale may be seen. This uranium content correlates with a correlation coefficient of approximately 0.977 with the organic carbon content of the shale. The uranium/potassium ratio shown in FIG. 2 of the New Albany shale correlates with a correlation coefficient of approximately 0.975 with the organic carbon content of this shale.

It is known that uranium salts are dissolved in sea water world wide and have been for geological epochs of time. It is also known that these salts have an electrical affinity for organic carbon which is deposited in ocean sediment containing organic matter. With uranium salts contained in these ancient sea waters, as these sediments were deposited to thicker and thicker depths, the actions of temperatures and pressures over geological epochs of times caused the formation of petroleum from the organic matter contained in these sediments. The sediment thus became the "source rock" for the creation of petroleum reserves. As the petroleum was created it tended to migrate until it was trapped and prevented by impermeable rock formations from penetrating to the surface. Of course, not all of the organic carbon content of the original sediments was converted into petroleum. Also, in this process the uranium, potassium and thorium salts which were contained in the ancient sea bottom sediments remained in the source rock material. Thus, by using the techniques of the present invention to determine quantitatively the amount of radioactive uranium, potassium, and thorium remaining in shale formations penetrated by a well borehole, an indication of the original organic carbon content of these shales can be formulated.

Thus, according to the techniques of the present invention, a prospective area of exploration can be analyzed by performing a natural gamma ray spectral logging operation through the earth formations penetrated by an exploratory borehole. The gamma radiation occurring in the earth formations penetrated by the borehole is quantitatively analyzed for its uranium, potassium and thorium content and one or more of these signals may then be used in conjunction with calibration curves such as those of FIGS. 2 and 3 to determine from this uranium, potassium or thorium content the percentage of these shale formations which is organic carbon. The organic carbon content of the shales is thought to be indicative of the source rock activity or source rock potential of the shales penetrated by the exploratory well borehole.

The foregoing descriptions may make other alternative arrangements apparent to those skilled in the art. It is therefore the aim of the appended claims to cover all such changes and modifications as fall within the true spirit and scope of the invention.

We claim:

1. A method for determining the source rock potential of shale formations penetrated by a well borehole, comprising the steps of:

moving a well tool having a gamma ray detector past earth formations penetrated by a well borehole;

detecting natural gamma radiation occurring in earth formations in the vicinity of a well borehole and generating signals functionally related to the energy and frequency of occurrence of such gamma radiation;

separating said signals into at least three energy regions corresponding to gamma radiation produced by radioactive isotopes of uranium, potassium and thorium occurring in said earth formations and producing count signals representative of the gamma radiation occurring in said at least three energy regions;

comparing said count signals with standard gamma ray spectra of radioactive isotopes of uranium, potassium and thorium to derive a quantitative indication of the relative abundances of these three elements in the earth formation; and deriving by comparing said relative abundances according to a predetermined relationship an indication of the organic carbon content of the earth formations, thereby obtaining an indication of the source rock potential of the earth formation.

2. The method of claim 1 wherein the steps are repeated at a plurality of depths in a well borehole and the indications of organic carbon content of the formations are recorded as a function of borehole depth.

3. The method of claim 1 wherein the step of deriving by comparison of said relative abundances is performed by comparing the relative abundance of uranium with a predetermined relationship relating this abundance to the occurrence of organic carbon content.

4. The method of claim 1 wherein the step of deriving by comparison of said relative abundances is performed by comparing the ratio of relative abundances of uranium to potassium with a predetermined relationship relating this abundance ratio to the occurrence of organic carbon content.

5. The method of claim 1 wherein the separating step is performed by separating said signals into three energy regions being approximately 1.36 to 1.60 MEV for potassium gamma rays, approximately 1.60 to 1.95 MEV for uranium gamma rays and approximately 2.40 to 2.86 MEV for thorium gamma rays.

* * * * *